United States Patent [19]

Ho

[11] Patent Number: 5,595,501

[45] Date of Patent: Jan. 21, 1997

[54] SLIDING CASE MOUNTING DEVICE

[76] Inventor: Hsin C. Ho, 20F-1, 268, Sec. 1, Wen-Hua Road, Pan Chiao, Taipei, Taiwan

[21] Appl. No.: 606,022

[22] Filed: Sep. 29, 1995

[51] Int. Cl.$^6$ .................................................. H01R 13/64
[52] U.S. Cl. .......................... 439/377; 439/354; 361/685; 312/333; 360/137
[58] Field of Search .................................. 439/350, 353, 439/354, 357, 358, 377; 361/683, 684, 685, 732, 740, 747; 312/332.1, 333, 334.1, 334.7; 360/97.01, 99.06, 137

[56] References Cited

U.S. PATENT DOCUMENTS

| Re. 34,369 | 9/1993 | Darden et al. | 439/377 |
|---|---|---|---|
| 5,045,960 | 9/1991 | Eding | 360/97.01 |
| 5,123,721 | 6/1992 | Seo | 312/333 |
| 5,262,923 | 11/1993 | Batta et al. | 361/685 |
| 5,277,615 | 1/1994 | Hastings et al. | 439/377 |

Primary Examiner—Khiem Nguyen
Attorney, Agent, or Firm—Pro-Techtor International

[57] ABSTRACT

A sliding case mounting device including two sliding case mounting rails fixed to two opposite long sides of a rectangular sliding case for permitting it to be installed in two tracks inside a mainframe, each sliding case mounting rail having two horizontal projecting plug rods perpendicularly disposed at two opposite ends at an outer side and respectively plugged into respective mounting holes on one lateral side of the sliding case, a circularly arched tip at one end for insertion into one track of the mainframe, two outward hooks perpendicularly disposed at two opposite ends at an outer side and hooked in respective mounting holes at the bottom side of the sliding case, a front extension strip, an inward hook raised from the front extension strip at an inner side for hooking in a respective retaining hole inside the mainframe, and a press portion at one end of the front extension strip for pressing by hand to release the inward hook from the respective retaining hole on the mainframe for permitting the sliding case to be disconnected from the mainframe.

1 Claim, 5 Drawing Sheets

SLIDING CASE MOUNTING DEVICE

BACKGROUND OF THE INVENTION

The present invention relates to a sliding case mounting device which comprises two maintain rails fixed to two opposite lateral sides of a sliding case for quick loading/unloading of the sliding case.

Regular diskdrives and CD-ROMs are now commonly made slidable so that they can be conveniently detachably installed in the mainframe of a personal computer. When a sliding diskdrive or CD-ROM is inserted into parallel tracks inside the mainframe, it is then fixed in place by screws. When to unload the sliding diskdrive or CD-ROM, the screws must be removed. Therefore, this installation procedure is somewhat complicated.

SUMMARY OF THE INVENTION

The present invention has been accomplished to provide a sliding case mounting device which permits the sliding case (diskdrive, CD-ROM, etc.) to be conveniently installed in the mainframe, or quickly dismounted from the mainframe. According to the preferred embodiment of the present invention, the sliding case mounting device comprises two sliding case mounting rails fixed to two opposite long sides of a rectangular sliding case for permitting it to be installed in two tracks inside a mainframe. Each of the sliding case mounting rails comprises a channel-like rail body for insertion into one track of the mainframe, a plurality raised portions raised from a horizontal top side of the channel-like rail body for contact with the inside wall of the respective track, two horizontal projecting plug rods perpendicularly raised from two opposite ends of the channel-like rail body at an outer side and respectively plugged into respective mounting holes on one lateral side of the sliding case, a circularly arched tip longitudinally extended from one end of the channel-like rail body for insertion into one track of the mainframe, two outward hooks respectively raised from two opposite ends of the channel-like rail body at an outer side and hooked in respective mounting holes at a bottom side of the sliding case, a front extension strip longitudinally extended from an opposite end of the channel-like rail, an inward hook raised from the front extension strip at an inner side for hooking in a respective retaining hole inside the mainframe, and a press portion at one end of the front extension strip remote from the channel-like rail body for pressing by hand to release the inward hook from the respective retaining hole on the mainframe for permitting the sliding case to be disconnected from the mainframe.

DETAILED DESCRIPTION OF THE PREFERRED EMBODIMENT

Figure 1:
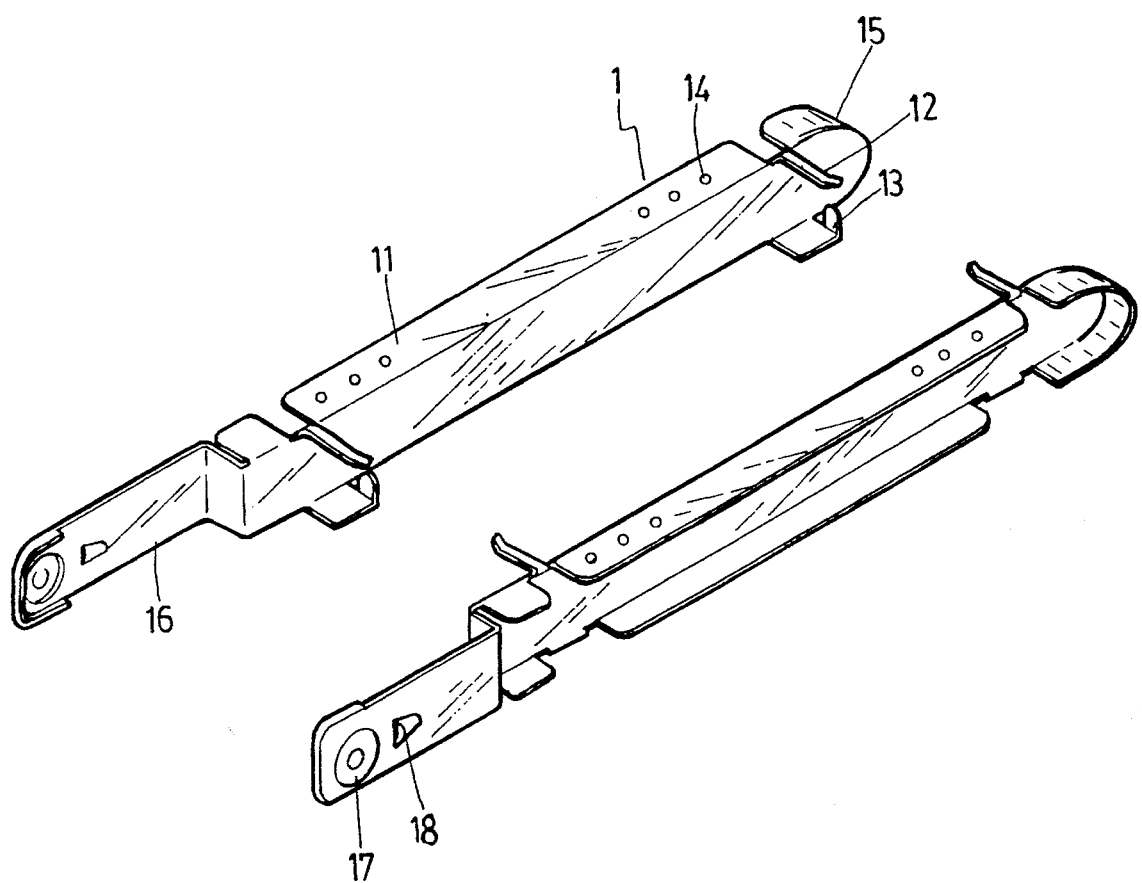
FIG. 1 shows a sliding case mounting device according to the present invention.
Figure 2:
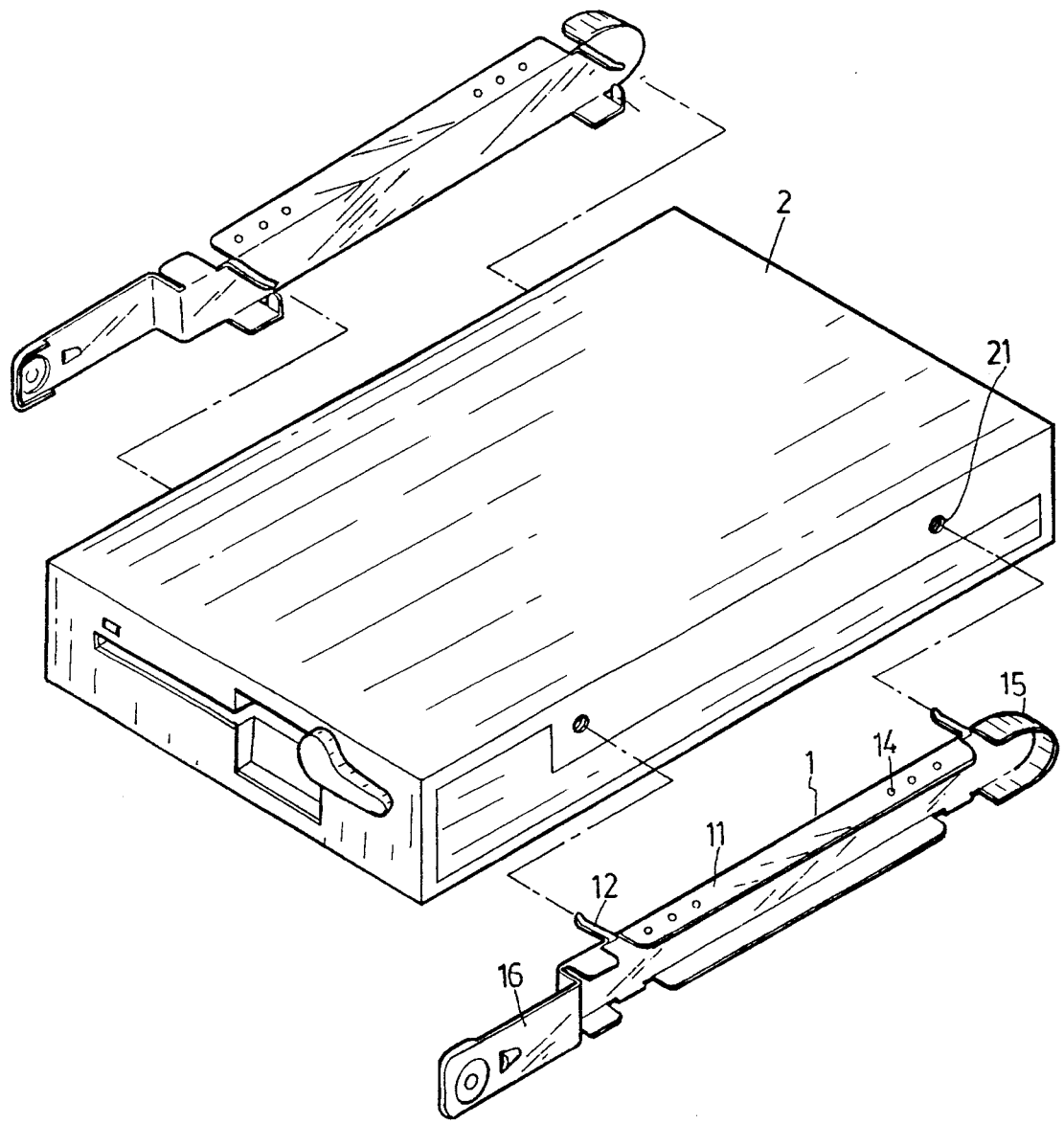
FIG. 2 shows the position of the sliding case mounting device relative to the sliding case according to the present invention.
Figure 3:
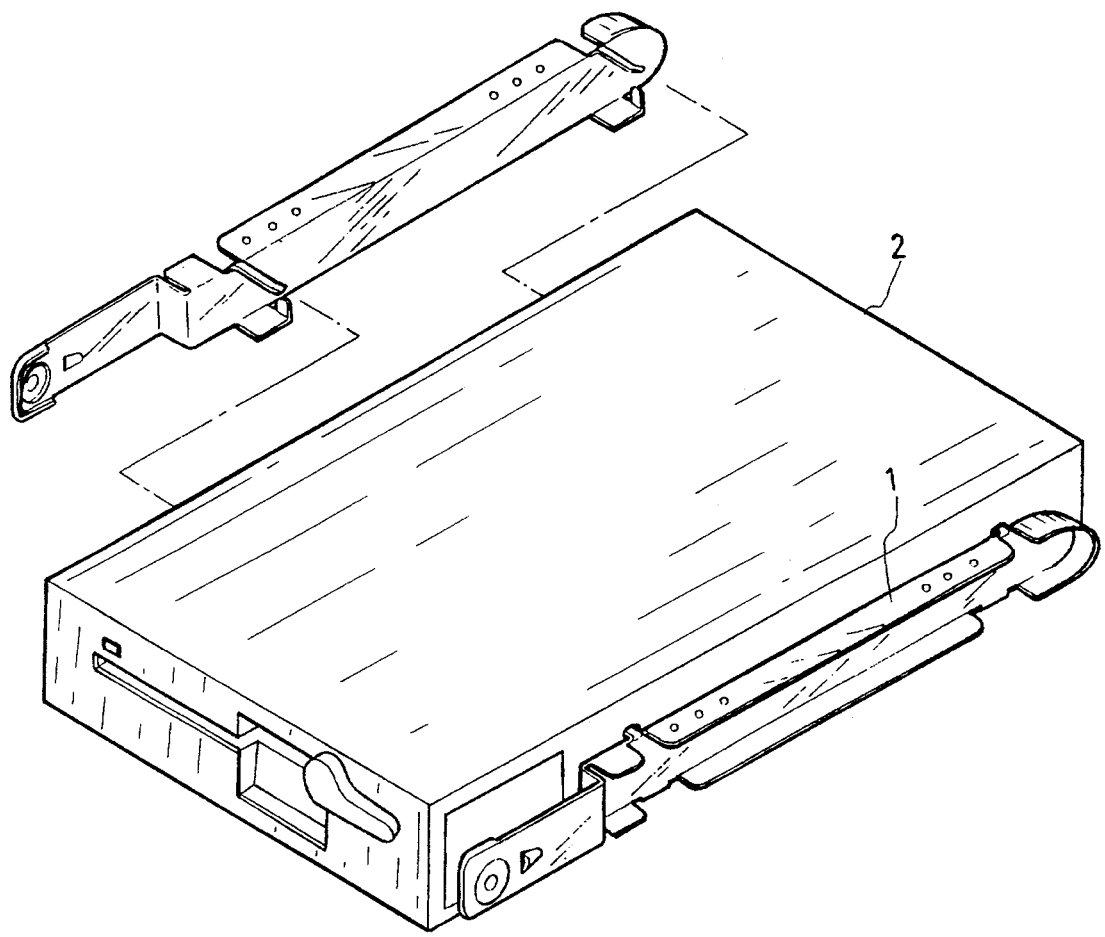
FIG. 3 shows one sliding case mounting rail of the sliding case mounting device fixed to one lateral side of the sliding case according to the present invention.
Figure 4:
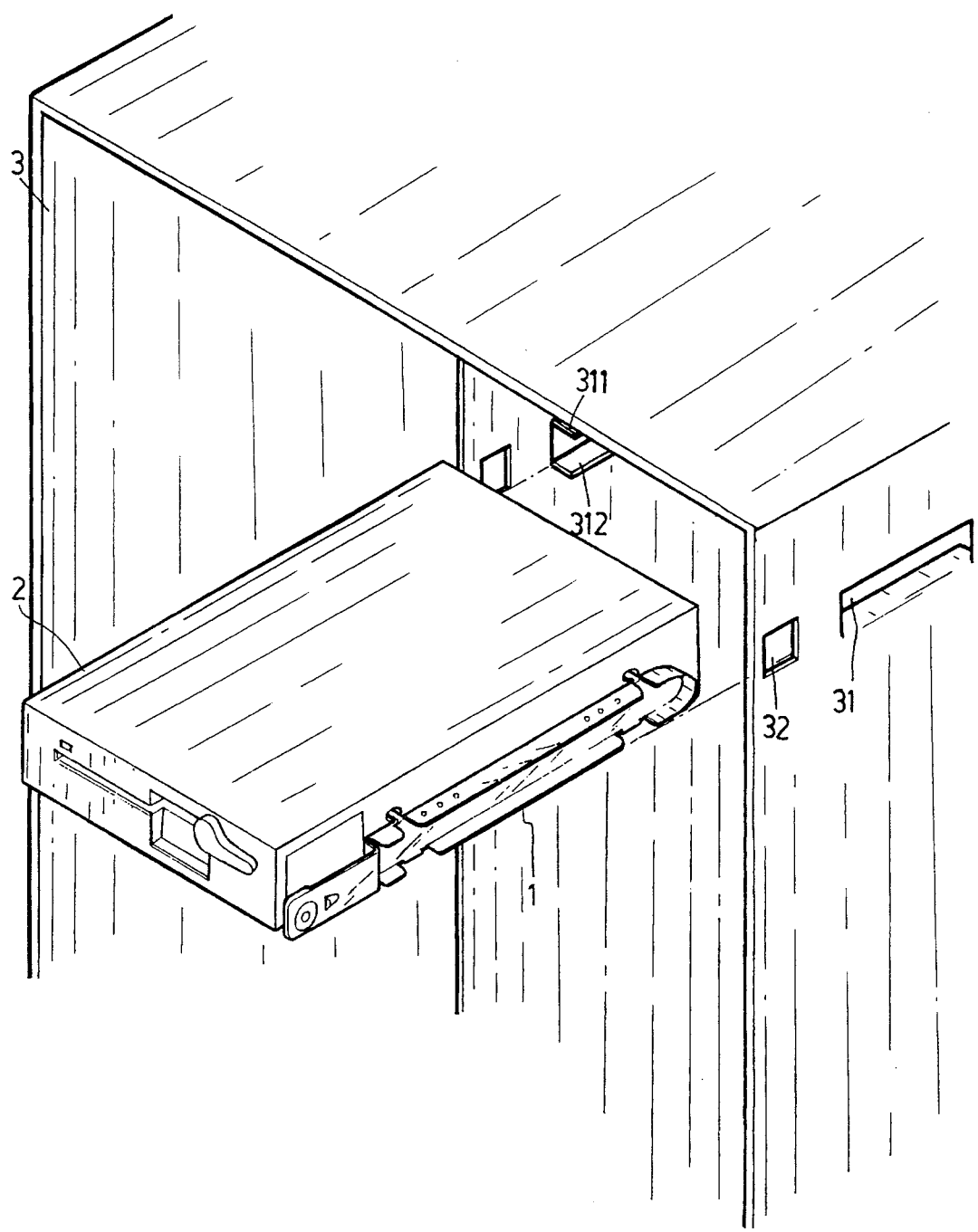
FIG. 4 shows the position of the sliding case mounting device with the sliding case relative to the mainframe according to the present invention.

Referring to FIGS. 1, 2, 3, and 4, the sliding case mounting device of the present invention comprises two sliding case mounting rails fixed to two opposite long sides of a rectangular sliding case 2 (for example, a diskdrive or CD-ROM), for permitting the rectangular sliding case 2 to be installed in a mainframe 3. Each of the sliding case mounting rails 1 comprises a channel-like rail body 11, a plurality raised portions raised from the channel-like rail body 11 at the top, two horizontal projecting plug rods 12 perpendicularly raised from two opposite ends of the channel-like rail body 11 at an outer side, a circularly arched tip 15 longitudinally extended from one end (namely, the rear end) of the channel-like rail body 11, two outward hooks 13 respectively raised from two opposite ends of the channel-like rail body 11 at an outer side and spaced below the projecting plug rods 12, a front extension strip 16 extended from an opposite end (namely, the front end) of the channel-like rail body 11, a press portion 17 at one end of the front extension strip 16 remote from the channel-like rail body 11, and an inward hook 18 raised from the front extension strip 16 at an inner side.

Figure 5:
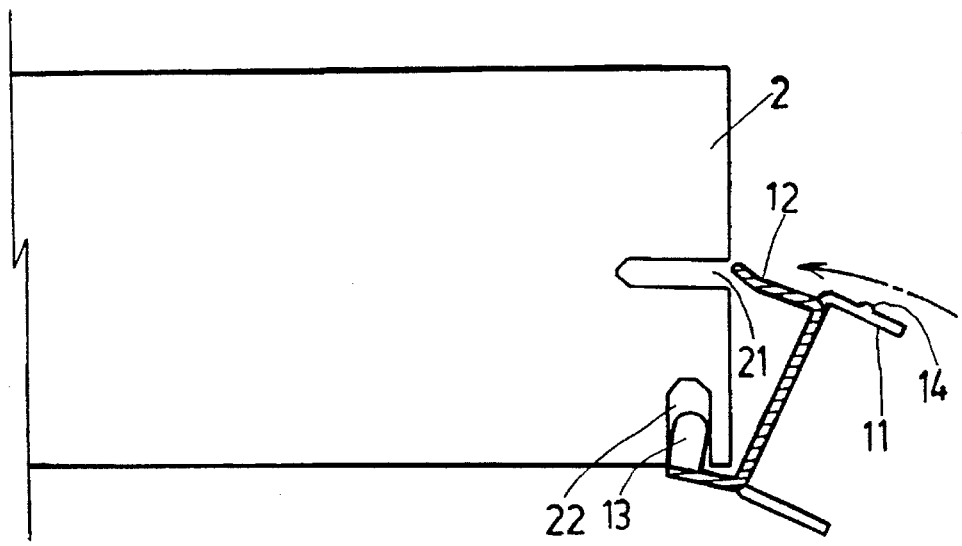
FIG. 5 is a sectional view showing the installation of one sliding case mounting rail according to the present invention.
Figure 6:
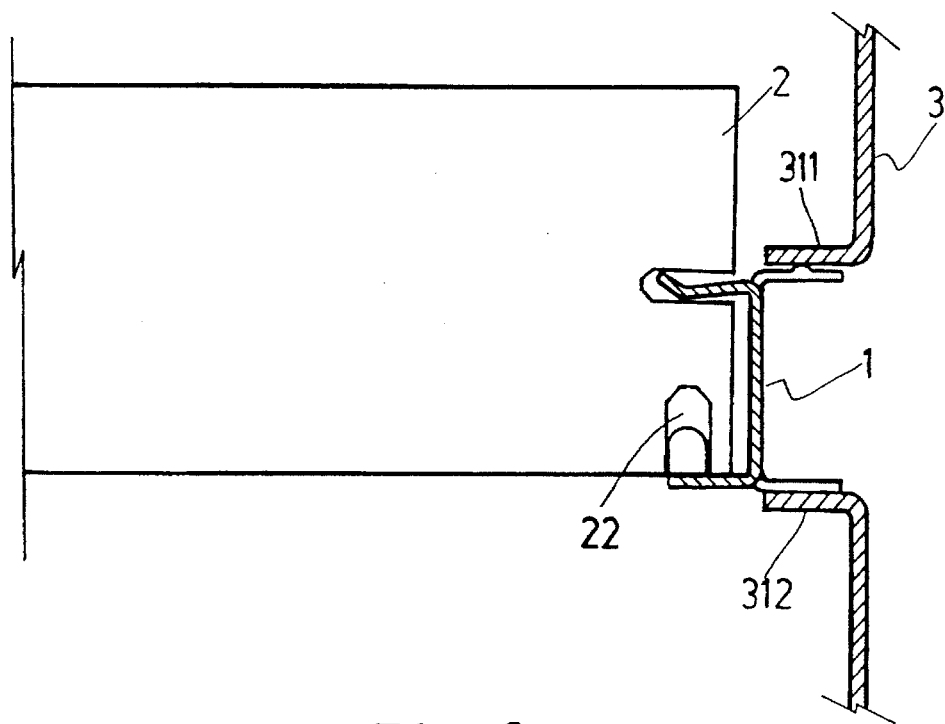
FIG. 6 is a sectional view showing the sliding case mounting rail fixed to the sliding case and installed in the track inside the mainframe according to the present invention.

Referring to FIGS. 5 and 6, and FIG. 4 again, each of the sliding case mounting rails 1 are fastened to two opposite lateral sides of the sliding case 2 by: hooking the outward hooks 13 in a respective bottom mounting hole 22 on the bottom side of the sliding case 2 (see FIG. 5), and then forcing the projecting plug rods 12 into a respective side mounting hole 21 on one lateral side of the sliding case 2 (see FIG. 6). When the two sliding case mounting rails 1 are fastened to the sliding case 2, the sliding case 2 is mounted in the mainframe 3 by inserting the circularly arched tips 15 of the sliding case mounting rails 1 into respective tracks 31, permitting the channel-like bodies 11 of the sliding case mounting rails 1 to be respectively retained between two opposite parallel flanges 311 and 312 of each track 31, and permitting the inward hook 18 of each of the sliding case mounting rails 1 to be hooked in a respective retaining hole 32 in front of each track 31. When the press portions 17 of the sliding case mounting rails 1 are respectively depressed inwards, the inward hooks 18 are respectively released from the respective retaining holes 32, and therefore the sliding case 2 can be moved out of the mainframe 3.

It is to be understood that the drawings are designed for purposes of illustration only, and are not intended as a definition of the limits and scope of the invention disclosed.

I claim:

1. A sliding case mounting device comprising two sliding case mounting rails fixed to two opposite long sides of a rectangular sliding case for permitting it to be installed in two tracks inside a mainframe, each sliding case mounting rail comprising a channel-like rail body for insertion into one track of said mainframe, a plurality raised portions raised from a horizontal top side of said channel-like rail body for contact with the inside wall of the respective track, two horizontal projecting plug rods perpendicularly raised from two opposite ends of said channel-like rail body at an outer side and respectively plugged into respective mounting holes on one lateral side of said sliding case, a circularly arched tip longitudinally extended from one end of said channel-like rail body for insertion into one track of said mainframe, two outward hooks respectively raised from two opposite ends of said channel-like rail body at an outer side and hooked in respective mounting holes at a bottom side of said sliding case, a front extension strip longitudinally extended from an opposite end of said channel-like rail, an inward hook raised from said front extension strip at an inner side for hooking in a respective retaining hole inside said mainframe, and a press portion at one end of said front extension strip remote from said channel-like rail body for pressing by hand to release said inward hook from the respective retaining hole on said mainframe for permitting said sliding case to be disconnected from said mainframe.

* * * * *